US006320821B1

(12) United States Patent
Goldring et al.

(10) Patent No.: US 6,320,821 B1
(45) Date of Patent: Nov. 20, 2001

(54) FLUIDBORNE SOUND PROJECTOR

(75) Inventors: Jeffrey S. Goldring; David B. Larrabee; John W. Henry, IV, all of Annapolis, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/559,051

(22) Filed: Apr. 27, 2000

(51) Int. Cl.[7] ...................... H04B 13/02
(52) U.S. Cl. ...................... 367/143
(58) Field of Search ...................... 367/143, 142; 181/120, 119

(56) References Cited

U.S. PATENT DOCUMENTS 3,516,052 * 6/1970 Bouyoucos ........................ 367/143
4,030,063 6/1977 Wallen .
4,483,411 11/1984 Mifsud .
5,467,322 11/1995 Walter .
5,894,451 4/1999 DeJaco et al. .

* cited by examiner

*Primary Examiner*—Daniel T. Pihulic
(74) *Attorney, Agent, or Firm*—Jacob Schuster

(57) ABSTRACT

A fluidborne projector of sound derived from an electromechanical noise source translates acoustical energy through a piston subjected to balanced pressures of gas and liquid to enabled dynamic displacement thereof. Such displacement of the piston to a static position is regulated by controlled pressurization of gas, mechanically limited to prevent damage from changing pressures exerted on the piston.

10 Claims, 2 Drawing Sheets

FLUIDBORNE SOUND PROJECTOR

The present invention relates generally to the translation of acoustical energy into a body of liquid such as water from a high power acoustical source.

BACKGROUND OF THE INVENTION

Acoustical energy projector devices, such as a fluidborne noise source delivering underwater sound are generally known in the art. Such projector devices when adapted for use in a piping system operating under high pressures of up to 1000 psi for example, have been found to be unsuitable because of their fragility, subjecting it to damage during operation and its inability to deliver acoustical energy at a relatively high power level. It is therefore an important object of the present invention to provide an acoustical projector of fluidborne sound or noise within a wide acoustical spectrum, with a monitored input under control and to prevent damage due to changing system pressures entrapped in the delivery device.

SUMMARY OF THE INVENTION

In accordance with the present invention, an acoustical projector device is provided for a fluidborne noise generating system, within which input acoustical energy at controllable power level is translated to a body of liquid through a piston undergoing displacement to a static position within a pressure sealed chamber assembly through which gas and liquid are applied to the piston under automatically balanced pressures, with further regulated positioning of the piston being effected by controlled pressurization and venting of the gas within the piston chamber. Displacement of the piston is also mechanically limited to prevent damage by changing operational pressures exerted thereon to thereby accommodate a wide diversity of characteristics of the acoustical energy to be translated, such as sound frequencies, tones, bands and wave forms.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
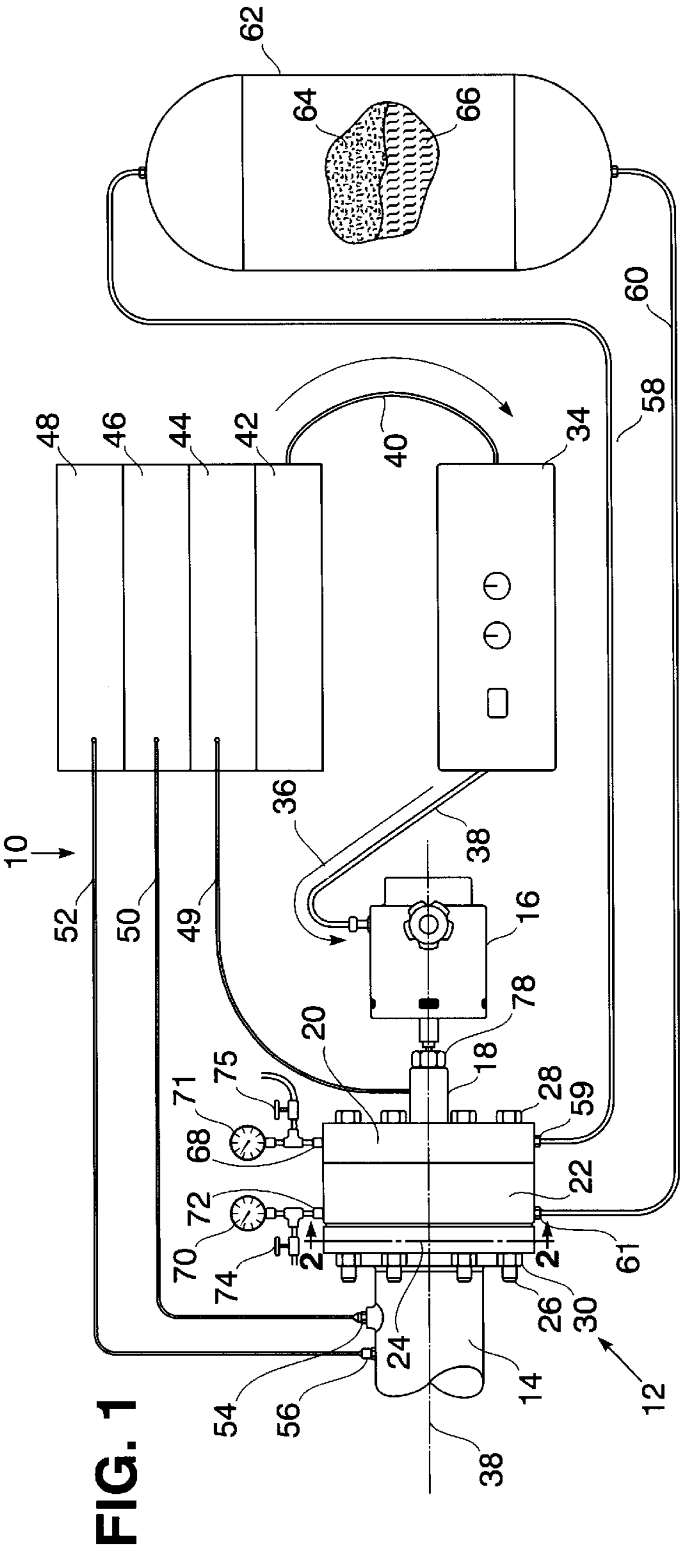
FIG. 1 is a side elevation view of an acoustical projector device in accordance with one embodiment, in association with other components of a fluidborne noise generating system.
Figure 2:
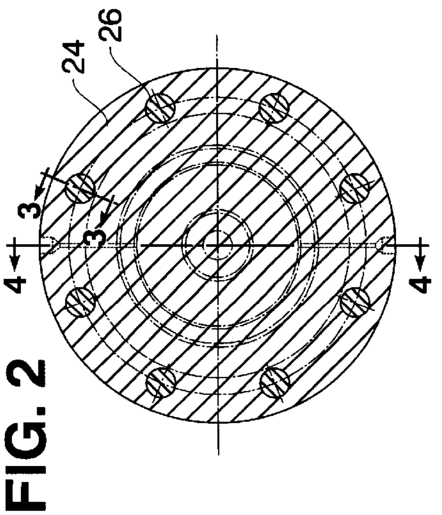
FIG. 2 is a transverse section view of the projector device, taken substantially through a plane indicated by section line 2—2 in FIG. 1.
Figure 3:
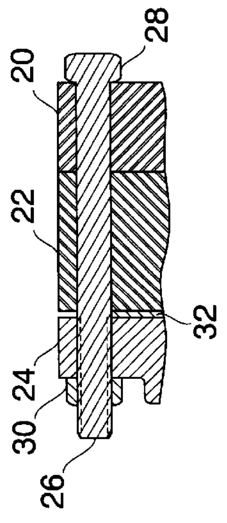
FIG. 3 is a partial section view taken substantially through a plane indicated by section line 3—3 in FIG. 2.

Referring now to the drawing in detail, FIG. 1 illustrates a fluidborne noise generating system generally referred to by reference numeral 10, having an acoustic projector device 12 constructed in accordance with the present invention for supply of fluidborne sound through at tubular output conduit 14 to a liquid retention facility such as a water piping system, a tank or a sea chest. An external source of sound for the projector device 12 is derived from an electromechanical or piezoelectric type shaker 16, generally known in the art, attached to a tubular input end portion 18 of the projector device 12. The tubular input portion 18 axially projects through an annular section 20 of the projector device 12 into an abutting annular projector section 22 in slidably sealed relation to the section 20. The projector sections 20 and 22 are held in assembled attachment to the tubular output conduit 14 through an annular flange portion 24 thereof by a plurality of threaded fastener bolts 26. As shown in FIGS. 1, 2 and 3, each of such fastener bolts 26 has at one axial end a head portion 28 abutting the projector section 20 and is threaded at its opposite axial end for reception of a nut 30 in abutment with the conduit flange portion 24 closely spaced from the projector section 22 by a gasket seal 32.

With continued reference to FIG. 1, in accordance with one embodiment of the sound generating system 10 with which the projector device 12 is associated, an amplified electrical power source 34 delivers a driving signal 36 through wiring 38 to the shaker 16 under control of an input signal in wiring 40 generated by an acoustic spectrum analyzer system 42 in accordance with different variable sensor data from analyzer modules 44, 46 and 48. The analyzer module 44 is connected by a sensor output signal line 49 to the tubular input portion 18 of the projector device 12, while the analyzer modules 46 and 48 are respectively connected by hydrophonic and accelerometer pressure signal lines 50 and 52 to monitoring taps 54 and 56 on the tubular output conduit 14 of the projector device 12. Gas venting and liquid pressure controls are also provided for the projector device 12, as hereinafter explained, through pressure monitoring lines 58 and 60 respectively connected to the projector sections 20 and 22 by taps 59 and 61. Such pressure monitoring lines 58 and 60 are respectively connected to opposite ends of a pressure-tight tank 62 for respective communication with pressurized bodies of gas 64 and liquid 66 therein, as shown in FIG. 1. Pressure is monitored through a tap 72 in the projector section 22 under control of valve 74 by a gauge 70, while pressurized gas, such as air, is supplied to the projector section 20 through a tap 68 under gas venting control of a manually operated valve 75. Venting of gas within the projector device 12 occurs through a radial passage 76 in projector section 22 as shown in FIG. 4, hereinafter referred to in connection with the internal details of the projector device 12.

Figure 4:
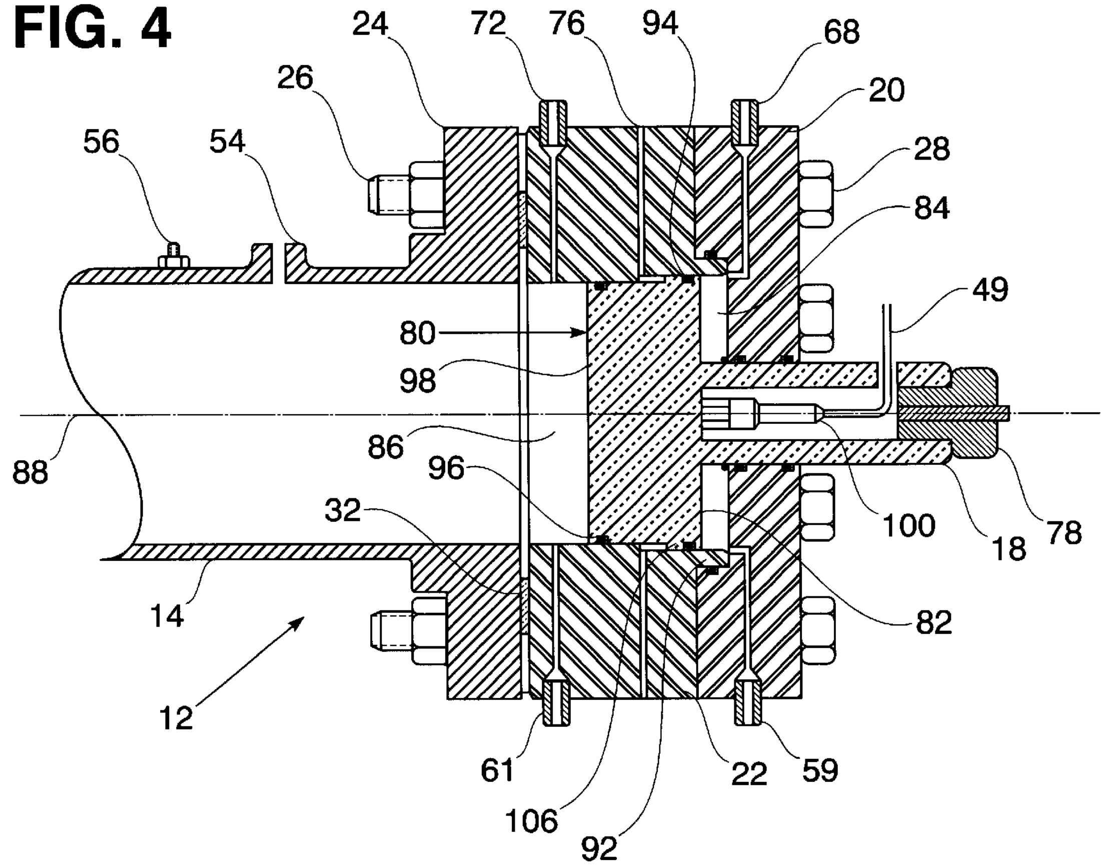
FIG. 4 is a side section view of the projector device taken substantially through a plane indicated by section line 4—4 in FIG. 2.

With continued reference to FIG. 4, the sound output of the shaker 16 is transmitted to the tubular input portion 18 of the projector device 12 at its external end through a connector 78. Such tubular input portion 18 is connected at its internal end within the projector section 22 to a piston 80 at a larger diameter end 82 thereof. Axial displacement of the piston 80 is thereby induced within a larger diameter chamber 84 internally formed within the section 22 and terminating at one axial end of a smaller diameter chamber portion 86 within the projector section 20, extending axially toward the gasket seal 32 through which acoustical energy is translated within a passage in the tubular conduit 14 along its axis in common with the axis 88 of the projector device 12.

Figure 4A:
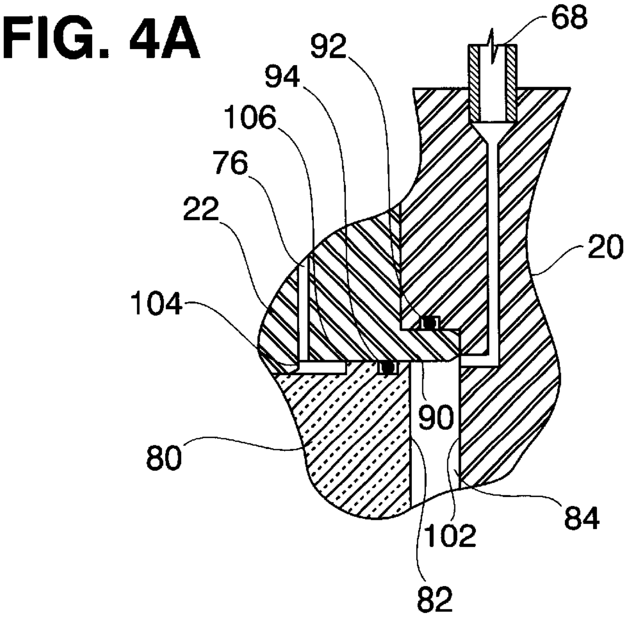
FIG. 4A is an enlarged portion of the section view of FIG. 4, illustrating mechanical limiting of piston displacement in the projector device.

The projector section 22 as shown in FIGS. 4 and 4A has a portion 90 projecting into the section 20 and in interfitting relation thereto through an annular seal 92. Another annual seal 94 is carried in the larger diameter portion 106 of the piston 80 to seal opposite end portions of the larger diameter chamber 84 from each other in the section 22. A third annular seal 96 on the piston 80 in close adjacency to its smaller diameter end 98 is provided to seal chamber 86 from the axial end of the larger diameter chamber 84 into which gas venting passage 76 extends. The other axial end of chamber 84 is in communication through passages with the gas tap 59 to the tank 62 and the gas pressure tap 68. Chamber 86 is also in communication with tank 62 through passage to the liquid tap 61 in section 22 as shown in FIG. 1, while pressurized liquid is received in chamber 86 through valve 74 and tap 72.

It is apparent from the foregoing description that the external sound producing operation of the shaker 16, isolated from water exposure, translates acoustical energy into vibratory movement of the piston 80 to a static position between displacement limits as shown in FIGS. 4 and 4A for projecting sound into liquid through conduit 14 at different sound frequencies under control exercised by balancing between pressures of the liquid and gas in chambers 84 and 86 through taps 59 and 61. Such balancing is automatically performed by monitoring piston displacement velocity through an underwater type acceleration sensor 100 within the projector end portion 18 connected by signal line 49 as shown in FIG. 4 to the data module 44 shown in FIG. 1 for control over operation of the shaker 16 by the amplified power source 34 through the spectrum analyzer system 42. Changing system pressure during such automatically controlled operation is affected by limiting displacement of the piston 80 within chamber 84. As shown in FIG. 4A, the diametrically larger chamber 84 extends axially between an annular stop surface 102 in the projector section 20 and a radially smaller annular stop surface 104 on the projector section 22. A diametrically larger portion 106 of the piston 80 is engageable with such stop surfaces 102 and 104 to limit its displacement. Also, the position of piston 80 between stops 102 and 104 is regulated by pressurized gas supplied to chamber 84 through tap 68, while the gas therein is vented at one axial end through passage 76. Pressurized air at the other axial end portion of chamber 84 is monitored by gauge 70 through tap 68. Pressurized gas is accordingly added to chamber 84 or vented therefrom while damage from changing system pressures from chamber portion 86 is prevented and different types of sound and a diversity of wave forms is accommodated under control of the drive signals generated by the spectrum analyzer system 42.

Obviously, other modifications and variation of the present invention may be possible in light of the foregoing teachings. It is therefore to be understood that within the scope of the appended claims the invention may be practiced otherwise than as specifically described.

What is claimed is:

1. In combination with a device for projecting sound into a body of liquid through a piston having opposite axial ends respectively exposed acoustically to the body of liquid and mechanically to a sound generating power source; means for respectively exposing said opposite ends of the piston to gas and liquid under balanced pressures; chamber means within which displacement is acoustically imparted by the sound generating power source to the piston under said balanced pressures; means for venting gas from said chamber means; and pressure control means for regulating pressurization of the gas in the chamber means.

2. The combination as defined in claim 1, wherein said pressure control means comprises, a source of pressurized gas and valve means through which said source of pressurized gas is connected to the chamber means for supply of the pressurized gas thereto to which one of the axial ends of the piston is exposed.

3. The combination as defined in claim 2, wherein said chamber means includes an axially extending portion formed between axially spaced stop surfaces engageable by the piston to mechanically limit said displacement thereof.

4. The combination as defined in claim 3, wherein said piston includes a diametrically larger portion axially extending from said one of the axial ends of the piston, said larger portion of the piston being engageable with the stop surfaces.

5. The combination as defined in claim 4, wherein said chamber means further includes a diametrically smaller portion to which the liquid is confined under one of the balanced pressures to which said one of the axial ends of the piston is exposed.

6. The combination as defined in claim 1, wherein said chamber means includes an axially extending portion formed between axially spaced stop surfaces engageable by the piston to mechanically limit said displacement thereof.

7. The combination as defined in claim 6, wherein said chamber means further includes a diametrically smaller portion to which the liquid is confined under one of the balanced pressures to which one of the axial ends of the piston is exposed.

8. The combination as defined in claim 6, wherein said piston includes a diametrically larger portion axially extending from one of the axial ends of the piston, said portion of the piston being engageable with the stop surfaces.

9. In combination with a device for projecting sound into a body of liquid through a piston having opposite axial ends respectively exposed acoustically to the body of liquid and mechanically to a high power acoustical source; means for respectively exposing said opposite ends of the piston to gas and liquid under balanced pressures; chamber means within which displacement is acoustically imparted to the piston under said balanced pressures; and means for preventing damage to the device from changing of the balanced pressures during generation of the sound projected, comprising: means for limiting the displacement of the piston within the chamber means; means for venting gas from said chamber means; and pressure control means for regulating pressurization of the gas in the chamber means.

10. The combination as defined in claim 9, wherein said means for limiting the displacement of the piston comprises: a portion of the chamber means formed between axially spaced stop surfaces therein; and a diametrically larger portion of the piston engageable with the stop surfaces.

* * * * *